United States Patent [19]
Bienvenu

[11] Patent Number: 5,858,426
[45] Date of Patent: *Jan. 12, 1999

[54] MELTABLE FOOD PRODUCT, METHOD OF USE AND METHOD OF MAKING

[75] Inventor: Andre P. Bienvenu, Aurora, Colo.

[73] Assignee: Food Works, Inc., Miami, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 328,417

[22] Filed: Oct. 25, 1994

[51] Int. Cl.⁶ .............................. A23L 1/052; A23P 1/08
[52] U.S. Cl. ........................... 426/96; 426/290; 426/293; 426/295; 426/296; 426/305; 426/307; 426/573; 426/576; 426/589; 426/652
[58] Field of Search .................................... 426/573, 576, 426/89, 305, 650, 652, 290, 293, 295, 296

[56] References Cited

U.S. PATENT DOCUMENTS

| | | |
|---|---|---|
| 2,352,611 | 9/1944 | Bowers et al. . |
| 2,721,142 | 10/1955 | Shinn et al. . |
| 2,860,990 | 11/1958 | Guthrie . |
| 3,389,000 | 6/1968 | Fujita et al. . |
| 3,406,081 | 10/1968 | Bauer et al. . |
| 3,647,480 | 3/1972 | Cermale ................................ 99/140 R |
| 4,356,202 | 10/1982 | Todd ...................................... 426/573 |
| 4,473,592 | 9/1984 | Matthews et al. . |
| 4,704,294 | 11/1987 | Rakosky ................................. 426/578 |
| 5,063,073 | 11/1991 | Kratochvil ............................. 426/573 |
| 5,147,671 | 9/1992 | Winkler . |

OTHER PUBLICATIONS

Rombauer et al. Joy of Cooking, The Bobbs–Merrill Co (1975) pp. 113–114.

M. Given's Modern Encyclopedia of Cooking J. G. Ferguson Publ. Co. (1969) vol. 2 p. 1157.

*Primary Examiner*—Arthur L. Corbin
*Attorney, Agent, or Firm*—Brian D. Smith, P.C.

[57] ABSTRACT

A meltable food product for applying seasonings to food, or serving as a sauce for food, is disclosed. The product is designed to apply seasonings to food when it melts, which occurs as the food is cooked. The product has a gel-like consistency and is comprised of water, a solidifying agent, a food base, and seasonings embedded in the product. Methods for making and using the product are also disclosed.

17 Claims, 1 Drawing Sheet

MELTABLE FOOD PRODUCT, METHOD OF USE AND METHOD OF MAKING

TECHNICAL FIELD

The invention relates generally to the preparation of food products for human consumption, and more particularly, to a product for applying seasonings to food as the product and food are cooked.

BACKGROUND OF THE INVENTION

When preparing food for human consumption it is customary to add seasonings or apply sauces designed to enhance the flavor of the food. Without formal training in the culinary arts, the novice cook risks unappetizing consequences by applying seasonings which are not adequate for the food being prepared, or not in the correct amounts or combinations needed to yield an appetizing and flavorful result.

It would be desirable if there were a product that would enable a novice cook to conveniently and easily season food as a gourmet chef would season it. Such a product would give the novice cook freedom from worrying about what type, or what amount, or what combination of seasonings needs to be used to produce a flavorful and appetizing result. It would also be desirable if such a product were edible with the food it is being used on.

A search of the prior art in this area yielded several patents disclosing methods to treat and preserve meat products, but none offering a product which is simple and convenient to use. Patents such as U.S. Pat. Nos. 2,721,142 and 3,406,081 require that the food product to be treated be dipped in emulsions, and are used primarily to treat frozen food products which are to be stored. Other patents of a similar nature are U.S. Pat. Nos. 3,389,000; 4,473,592.

Of more relevance is U.S. Pat. No. 2,860,990, which discloses a method specifically for preparing a ham for consumption by applying a paste-like sugary layer on an inedible cheese cloth which covers the ham before cooking and requires that the inedible cheese cloth be removed after cooking. U.S. Pat. No. 5,147,671 also requires removal of an inedible netting before the meat product can be consumed.

Accordingly, there is a need for an edible product for enhancing the flavor of food which can be easily and conveniently used. Such a product would preferably enable the cook to season the food in one step.

SUMMARY OF THE INVENTION

An object of the present invention is to provide an edible product used to enhance the flavor of food, which can easily and conveniently be used. In accordance with this object, the present invention provides a product for enhancing the flavor of foods and methods of using the product. The product is a meltable food product which can be applied to enhance the food's flavor. The meltable food product comprises a meltable base which melts at a temperature greater than about 75 Fahrenheit, and which contains water, a base food flavoring agent, and a solidifying agent. In addition, the product has seasonings embedded in its meltable base. One method of using the product is to provide a container, place food in the container, then place the meltable base on the food, and heat the food and base placed thereon so that the base melts on the food and into the container so as to deposit the seasonings on the food. Furthermore, the melted product can serve as a sauce or gravy to be applied to the food. Another method of using the product includes heating the meltable food product by itself in a container so that its base melts to form a sauce which can be applied to food to enhance the food's flavor. The invention thus provides the convenience of having all the seasonings pre-selected in combinations known to be effective in enhancing the flavor of different foods and in preparing different sauces. The foods to which the invention typically applies are poultry, fish, beef, veal, pork, and wild game.

In a preferred embodiment of the invention, the product includes a mixture of water, food base, gelatin, and seasonings, combined together in a gel-like, flexible mass in the form of a sheet. The sheet can then be placed on the food which is to be cooked so that it melts on the food as the food cooks, or the sheet can be melted by itself to make a sauce.

The methods of the present invention include making the meltable food product, applying the meltable food product to food to deposit seasonings on the food, and making a sauce from the meltable food product.

A preferred method of making the meltable food product includes heating a mixture of water, base food flavoring agent, and solidifying agent until it boils, removing undesirable fatty by-products and particles from the mixture, pouring the mixture into a mold, cooling the mixture until it turns into a semisolid mass, adding seasonings to the semisolid mass by sprinkling the seasonings on the surface of the mass, and then further cooling the semisolid mass to form a gel-like, flexible, meltable food product.

A preferred method of using the product to apply seasonings embedded in the product to food includes providing a container, placing the food desired to be seasoned in the container, placing the meltable flexible food product on top of the food, heating the food with the meltable food product placed thereon so that its meltable base melts on the food and into the container, thereby depositing the seasonings on the food. The preferred method also includes collecting the melted base having melted into the container so that the now melted base can be applied as a sauce to the now seasoned food or other food.

Preferred methods of using the collected melted base as a sauce are to add water to it to form an au jus sauce or to add modified food starch to it to form a thicker sauce or gravy.

BRIEF DESCRIPTION OF THE DRAWINGS

The invention will be more readily understood by reference to the accompanying drawings wherein like reference numerals indicate like elements throughout the drawing figures and in which.

BEST MODE FOR CARRYING OUT THE INVENTION

Figure 3:
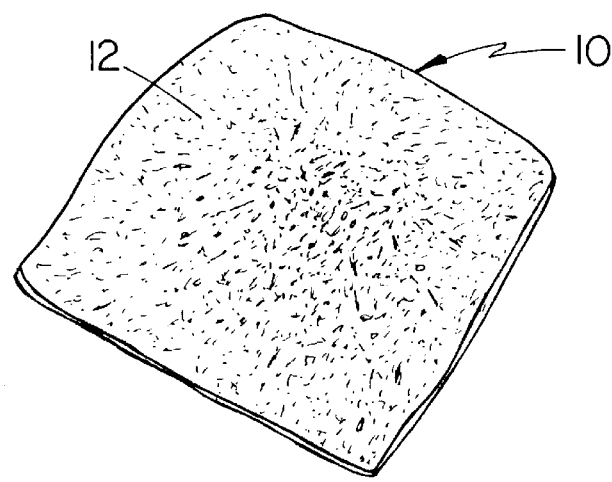
FIG. 3 is a perspective view of the present invention showing a semisolid flexible sheet with seasonings imbedded within it.

FIG. 3 illustrates a gel-like meltable product or wrap 10 of the present invention having a square-like sheet shape with seasonings 12 embedded within it. The meltable wrap 10 includes a meltable base (not numbered) containing water, a solidifying agent such as gelatin, gum extract, or aspic powder, and a base food flavoring agent such as beef stock, chicken stock, fish stock, or pork stock.

The term "stock" in general refers to many culinary preparations used for sauces, stews, or braising. As used in the present invention, the stock used will depend on the particular food to which the wrap 10 is intended to be applied, i.e., beef, poultry, fish, pork, or game.

Beef stock generally consists of beef trimmings and bones, aromatic ingredients, liquid, and seasonings. However, these seasonings are not to be confused with the seasonings 12 embedded in the wrap 10. The beef trimmings, bones, aromatic ingredients, liquid, and seasonings are mixed together and heated and then strained to form the beef stock in a conventional manner known to those skilled in the relevant art. Likewise, chicken stock generally consists of chicken trimmings and bones, aromatic ingredients, liquid, and seasonings which are mixed together, heated, and strained to form the chicken stock. Pork stock generally consists of pork trimmings and bones, aromatic ingredients, liquid, and seasonings mixed together and heated and then strained to form the pork stock. Finally, fish stock generally consists of bones and trimmings of fish, aromatic ingredients, liquid, and seasonings, mixed together and heated and then strained to form the fish stock. These definitions of the different stocks used in the present invention are general in nature and may be changed to suit particular tastes without departing from the spirit of the invention because the culinary art of making stocks allows for individual preferences.

In a preferred embodiment of the present invention, the meltable base of wrap 10 shown in FIG. 3 includes a base food flavoring agent which may be beef base, chicken base, fish base, or pork base. Beef base is simply beef stock with some additional ingredients such as food starch, vegetables, and flavorings. Likewise, all the stocks discussed above can be made into a corresponding base by adding these additional ingredients.

As previously mentioned, the meltable base of wrap 10 also includes a solidifying agent such as gelatin, gum extract, or aspic powder. Solidifying agents are flavorless ingredients that are used to give the meltable wrap 10 its gel-like, elastic consistency.

The seasonings 12 embedded within the meltable base of wrap 10 may include ingredients such as spices, condiments, or flavorings which are added to the meltable base 10 as the wrap is made (more on this infra) so as to enrich and enhance the flavor imparted by the wrap 10 when the base melts on a food to deposit the seasonings on the food as it is cooked.

Wrap 10 is preferably made by mixing water with a selected food base and gelatin to form a mixture. The mixture is heated until it boils and then is strained to remove fatty by-products and particles. The strained mixture is then poured into a mold having an open top and allowed to cool until it has a semisolid consistency, i.e., partially liquid and partially solid. The seasonings are then sprinkled on the now semisolid mixture so that they sink into the semisolid mixture but remain embedded near its top surface. The semisolid mixture with embedded seasonings is then further cooled until it has a more solid, gel-like elastic consistency.

Figure 1:
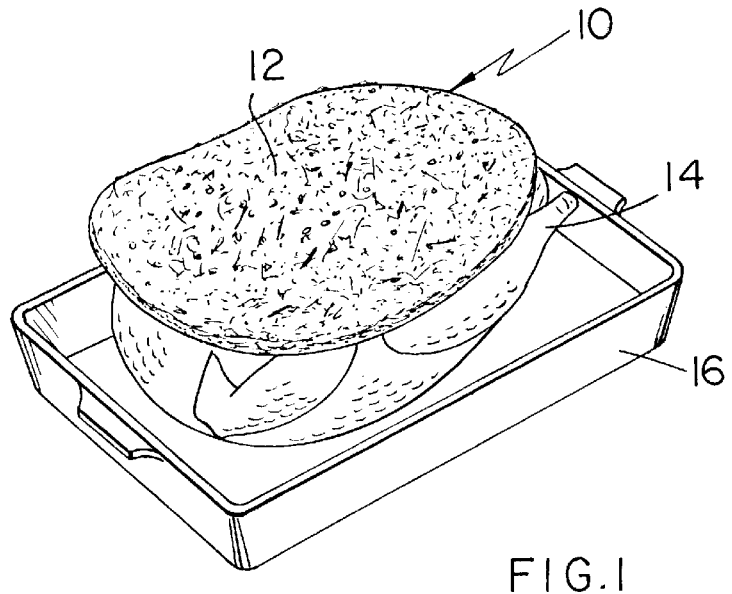
FIG. 1 is a perspective view illustrating the present invention placed upon a poultry food product in a container.
Figure 2:
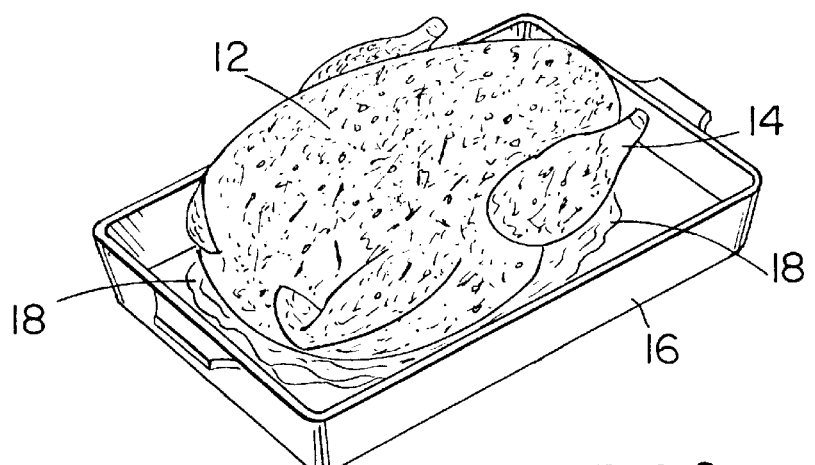
FIG. 2 is a perspective view showing the poultry product in a container with seasonings deposited thereon and with the remaining melted mass collected in the container.

FIG. 1 illustrates a preferred method of using wrap 10 to apply its seasonings 12 to a chicken 14. As illustrated in FIG. 1, wrap 10 is placed on a chicken 14 which in turn is placed in a container 16. FIG. 2 illustrates the combination of FIG. 1 after it has been heated or cooked. As shown, the wrap's seasonings 12 have been deposited on the chicken. As also shown, or as can be visualized, the meltable base of the wrap has melted on the food and collected in a pool 18 in container 16, which, depending upon the particular ingredients in the wrap, can occur at a temperature as low as 75 degrees Fahrenheit. The melted base substance in pool 18 can be used as a sauce to further enhance the flavor of the chicken 14 or another food. It can be used as collected, or diluted with water to form an au jus type sauce, or thickened with a modified food starch such as potato or corn starch or a roux to make a thicker sauce or gravy. Although not shown in the drawings, wrap 10 can also be melted and collected by itself in a container to form a liquid sauce which can then be applied to a desired food. This sauce can be used as melted, or water can be added to form an au jus sauce, or modified food starch can be added to form a gravy.

This invention has been described in detail with reference to particular embodiments thereof, but it will be understood that various other modifications can be effective within the spirit and scope of this invention.

What is claimed is:

1. A method of applying a meltable food product to food to enhance the food's flavor, comprising the steps of:

providing a meltable food product consisting essentially of:
   a meltable base having an elastic, flexible consistency consisting essentially of water, a base food flavoring agent, and a solidifying agent selected from the group consisting of gelatin, gum extract, and aspic powder, said base melting at a temperature greater than about 75 degrees Fahrenheit, said meltable base being provided in the form of a sheet having a top surface; and
   seasonings embedded in said meltable base near said top surface;

providing a container;

placing food in the container;

placing the meltable food product on the food;

heating the food with the meltable food product placed thereon so that the meltable base melts on the food and into the container so as to deposit the seasonings on the food.

2. A method as claimed in claim 1 further comprising the step of collecting the meltable base, having melted into the container, so that the melted base can be applied as a sauce to enhance a food's flavor.

3. A method as claimed in claim 1 further comprising the steps:

collecting the meltable base having melted in the container; and adding water to the melted base to form an au jus sauce.

4. A meltable food product for application to food to enhance the food's flavor, said meltable food product consisting essentially of:

a meltable base having an elastic, flexible consistency consisting essentially of water, a base food flavoring agent, and a solidifying agent selected from the group consisting of gelatin, gum extract, and aspic powder, said base melting at a temperature greater than about 75 degrees Fahrenheit, said meltable base being provided in the form of a sheet having a top surface; and seasonings embedded in said meltable base near said top surface.

5. A meltable food product as claimed in claim 4, wherein said meltable base contains between 85 and 95 weight percent water, 2 and 10 weight percent food base, and 1 and 5 weight percent solidifying agent.

6. A meltable food product as claimed in claim 4, wherein said meltable base contains between 92 and 94 weight percent water, 2 and 4 weight percent base food flavoring agent, and 2 and 4 weight percent solidifying agent.

7. A meltable food product as claimed in claim 4, wherein said base food flavoring agent is selected from the group consisting of beef stock, chicken stock, fish stock and pork stock.

8. A meltable food product as claimed in claim 4, wherein said base food flavoring agent is selected from the group consisting of beef base, chicken base, fish base and pork base.

9. A meltable food product as claimed in claim 4, wherein said embedded seasonings are visually distinguishable from said meltable base.

10. A meltable food product as claimed in claim 4, wherein said embedded seasonings are embedded by sprinkling them on said base when it has a semisolid consistency so that said seasonings become embedded near said top surface.

11. A meltable food product as claimed in claim 4, wherein said seasonings include spices.

12. A method for making a meltable food product for application to food to enhance the food's flavor, comprising the steps of:

mixing water with a base food flavoring agent and a solidifying agent selected from the croup consisting of gelatin, gum extract, and aspic powder to provide a mixture;

heating the mixture until it boils and forms fatty by-products and particles in the mixture;

removing the by-products and particles from the mixture to provide a strained mixture;

cooling the strained mixture until it turns into a semisolid mixture;

sprinkling seasonings on the semisolid mixture so that the seasonings become embedded near the surface of the mixture; and then further cooling the semisolid mixture containing seasonings so that the mixture further solidifies to form a meltable gel-like elastic food product consisting essentially of (1) a meltable base having an elastic, flexible consistency consisting essentially of water, a base food flavoring agent, and a solidifying agent selected from the group consisting of gelatin, gum extract, and aspic powder, said base melting at a temperature greater than about 75 degrees Fahrenheit, said meltable base being provided in the form of a sheet having a to p surface; and (2) seasonings embedded in said meltable base near said top surface.

13. A method as claimed in claim 12 wherein the base food flavoring agent is selected from the group consisting of beef stock, chicken stock, fish stock and pork stock.

14. A method as claimed in claim 12 wherein the base food flavoring agent is selected from the group consisting of beef base, chicken base, fish base and pork base.

15. A. method as claimed in claim 12 wherein said step of mixing to provide the mixture is carried out by providing a container, adding the water to the container, dissolving the base food flavoring agent in the water and then dissolving the solidifying agent in the water containing the dissolved base food flavoring agent to form the mixture.

16. A method as claimed in claim 15 further comprising removing the gel-like elastic food product from the container.

17. A method as claimed in claim 16 further comprising packaging the gel-like elastic food product to facilitate its handling.

* * * * *